Oct. 10, 1944.  A. H. OELKERS  2,360,262
SPRING GROUP
Filed Feb. 15, 1941  5 Sheets-Sheet 1
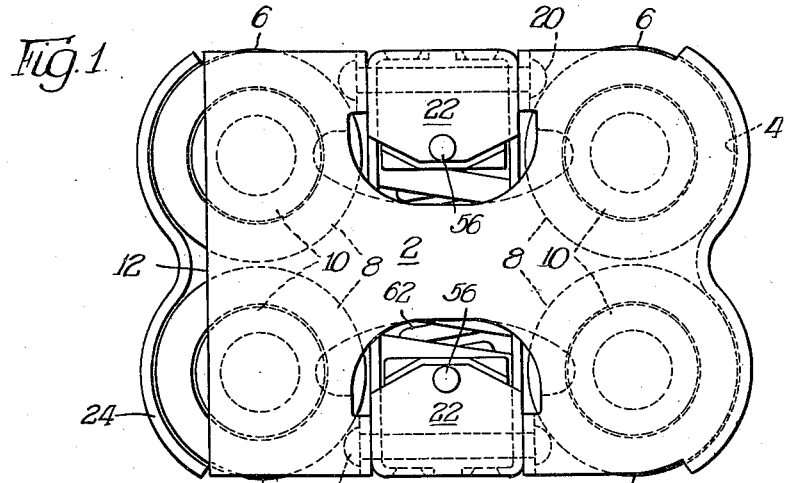
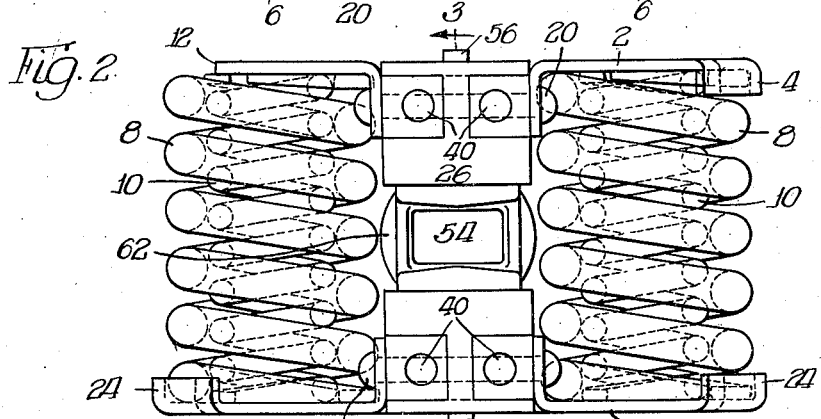
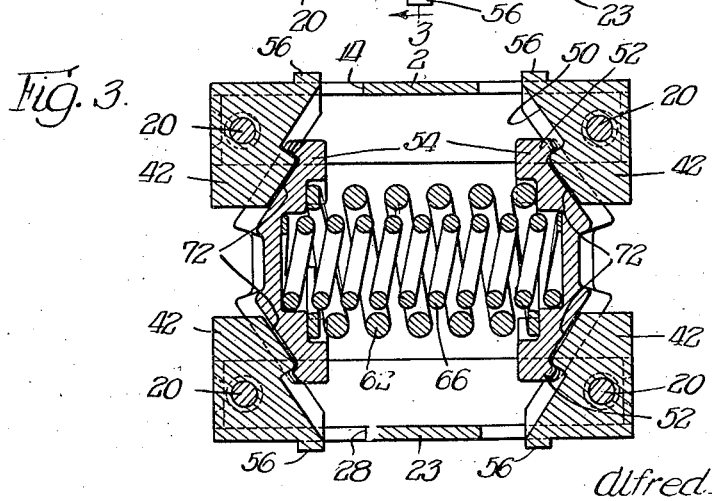
INVENTOR.
Alfred H. Oelkers, Oct. 10, 1944.   A. H. OELKERS   2,360,262
SPRING GROUP
Filed Feb. 15, 1941   5 Sheets-Sheet 2
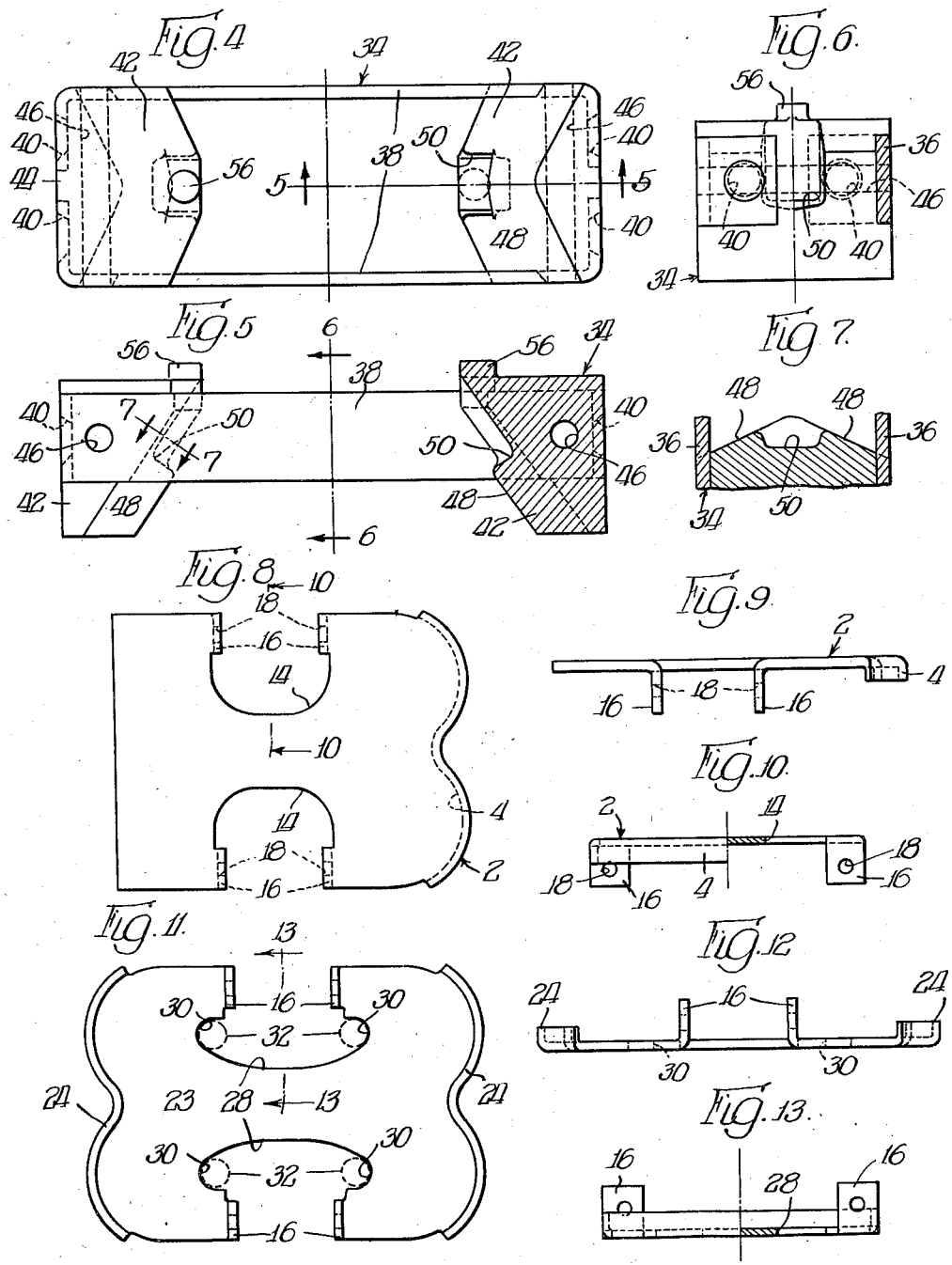
INVENTOR.
Alfred H. Oelkers.
BY
ATTY.

Oct. 10, 1944. A. H. OELKERS 2,360,262
SPRING GROUP
Filed Feb. 15, 1941 5 Sheets-Sheet 3
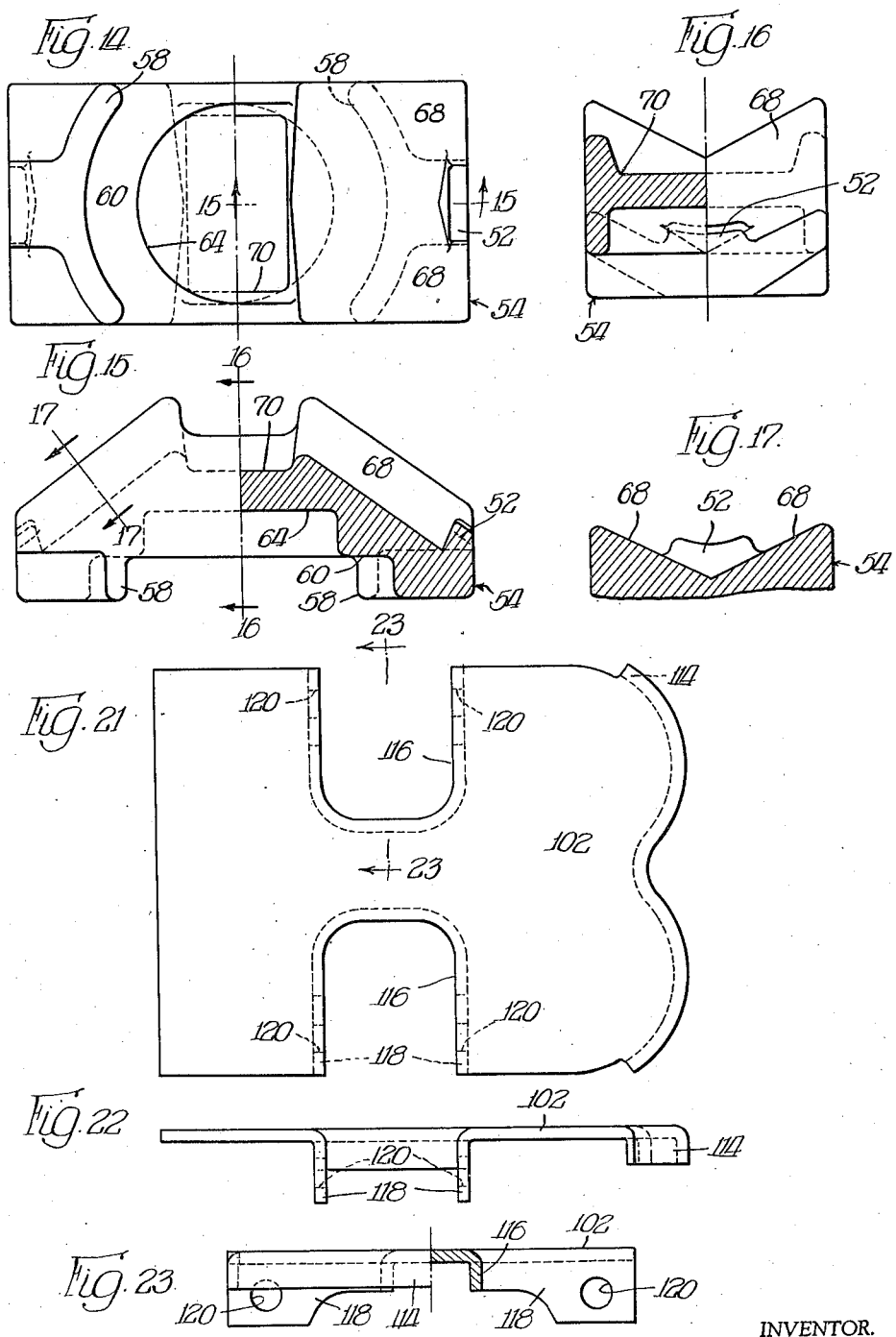

Oct. 10, 1944.                A. H. OELKERS                2,360,262
                               SPRING GROUP
                         Filed Feb. 15, 1941          5 Sheets-Sheet 4
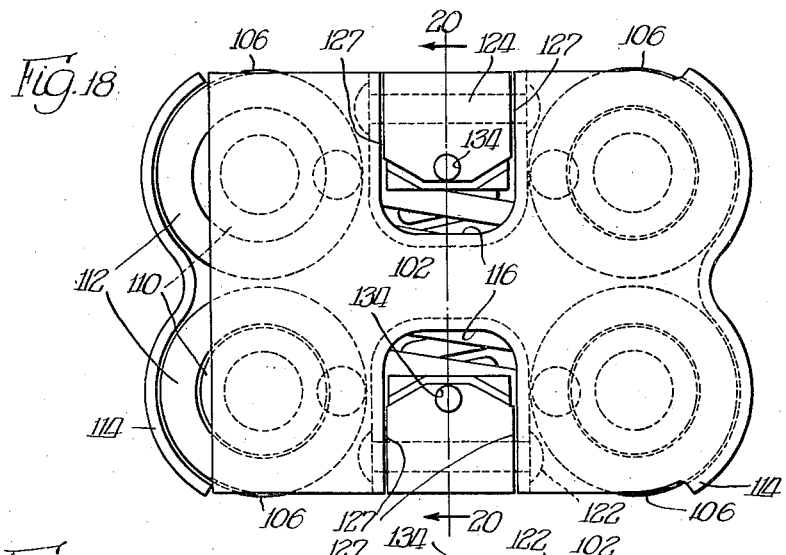
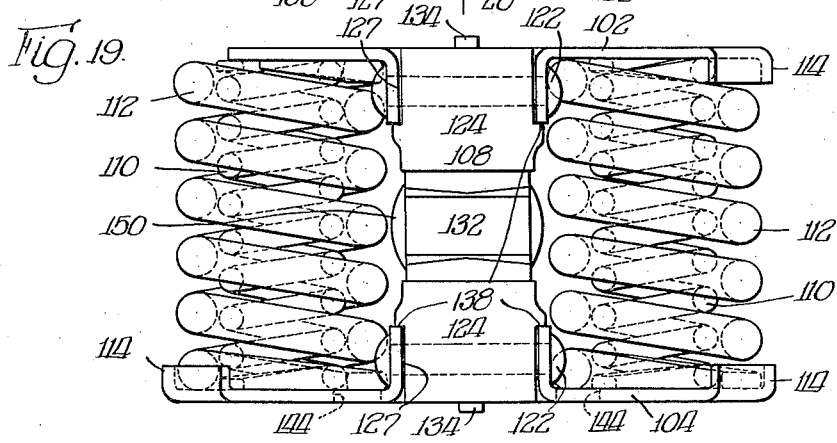
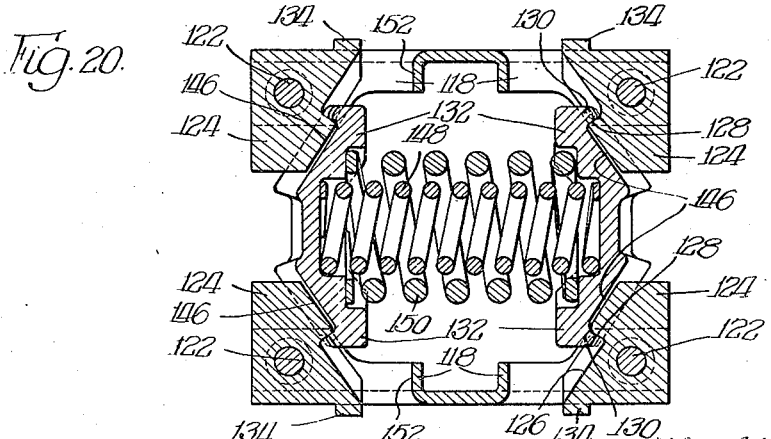
INVENTOR.
Alfred H. Oelkers
BY
Orrin O. B. Farmer
Atty.

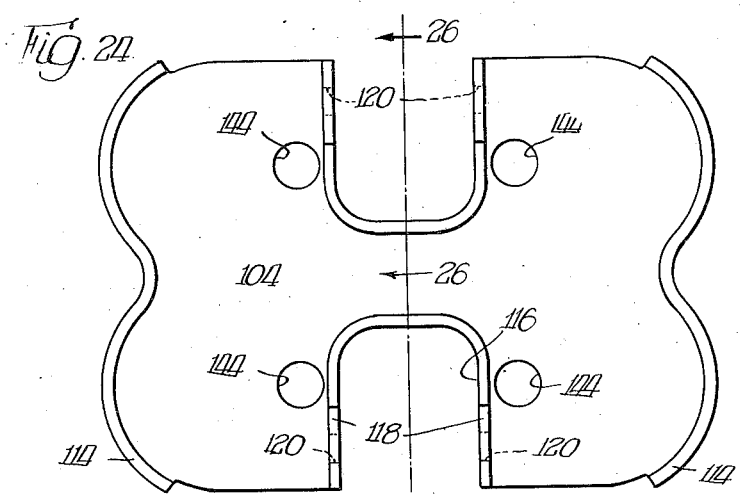
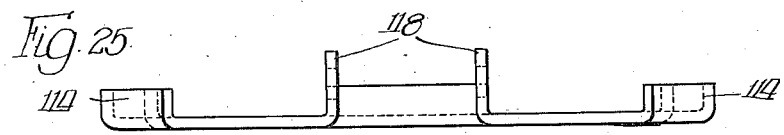
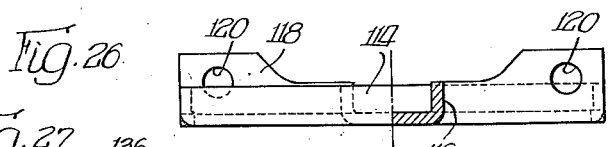
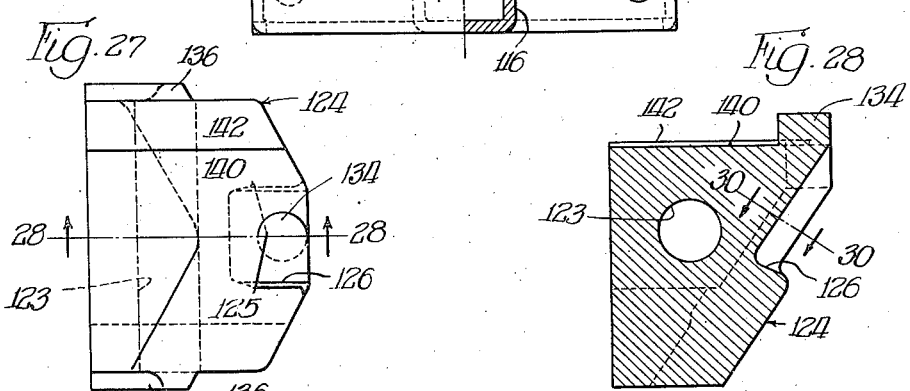
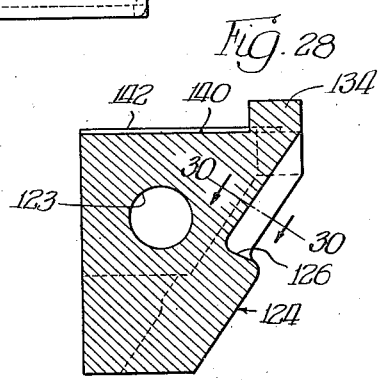
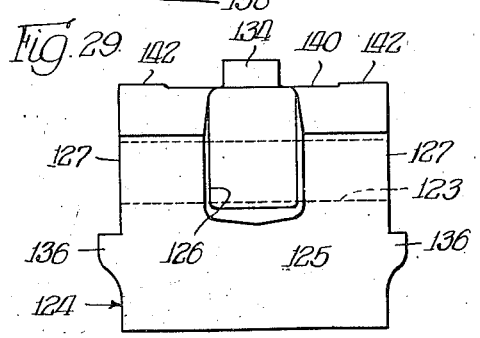
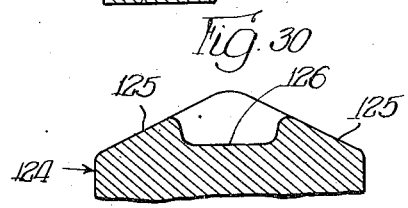

Patented Oct. 10, 1944

2,360,262

UNITED STATES PATENT OFFICE 2,360,262

SPRING GROUP

Alfred H. Oelkers, Chicago, Ill., assignor to American Steel Foundries, Chicago, Ill., a corporation of New Jersey Application February 15, 1941, Serial No. 379,030

21 Claims. (Cl. 267—9)

This invention relates to a composite spring group for a railway car truck, and more particularly to an assembly of coil springs with a friction absorbing device suitable for application to railway freight car trucks.

An object of my invention is to devise a relatively simple means of securing a friction device in a coil spring assembly in such manner that the friction wedge elements may be separately manufactured and conveniently assembled with the top and bottom spring plates.

A more specific object of my invention is to devise a composite coil spring and friction device assembly wherein top and bottom spring plates may be used, each of said plates being slotted at the opposite sides thereof and arranged for convenient assembly with the friction wedges which may be independently formed in order to utilize materials and methods particularly suitable for friction elements.

My invention comprehends an arrangement wherein the follower wedges associated with the top and bottom spring plates may each be formed as an assembly comprising a forged steel yoke at opposite ends of which may be mounted as by casting therein hard cast iron end members suitable for development of satisfactory friction areas.

My invention contemplates such an arrangement as that described wherein top and bottom spring plates are formed with aligned slots at opposite sides thereof defined by inturned flanges which may serve as means of securing wedge blocks at opposite sides of each plate, said flanges serving as abutment means for shoulders on said wedge blocks as additional positioning means therefor.

An additional object of my invention is to devise the various parts of my assembly in such form as to simplify manufacturing processes and to meet all requirements for satisfactory operation in railway equipment.

In the drawings, Figure 1 is a top plan view of one embodiment of my invention, Figure 2 is a side elevation thereof, and Figure 3 a sectional view through a transverse vertical plane indicated by the line 3—3 of Figure 2.

Figure 4 is a plan view of a follower wedge used in the device shown in Figures 1 to 3 inclusive, the left half of the view of Figure 4 showing a top plan view and the right half a bottom plan view.

Figure 5 is a side elevation of the follower wedge shown in Figure 4, the right half thereof being shown in section, and the section being taken substantially in the plane indicated by the line 5—5 of Figure 4.

Figure 6 is an end view, half in section, of the follower wedge shown in Figures 4 and 5, the section being taken substantially in the transverse plane bisecting the wedge as indicated by the line 6—6 of Figure 5.

Figure 7 is a further sectional view through the wedge surfaces of the follower wedge shown in Figures 4, 5, and 6, the section being taken in the diagonal plane substantially as indicated by the line 7—7 of Figure 5.

Figure 8 is a plan view of the top spring plate associated with the assembly shown in Figures 1 and 2, and Figure 9 is an edge or side elevation thereof, and Figure 10 an end elevation, half in section, the section being taken in the plane bisecting the plate substantially as indicated by the line 10—10 of Figure 8.

Figures 11, 12, and 13 show the bottom spring plate associated with the device shown in Figures 1 and 2, Figure 11 being a top plan view thereof, Figure 12 an edge or side elevation, and Figure 13 an end view, half in section, the section being taken substantially in the plane bisecting the plate transversely as indicated by the line 13—13 of Figure 11.

Figures 14 to 17 inclusive show my novel form of side wedge associated with the assembly shown in Figures 1 and 2, Figure 14 being a plan view, the left half thereof showing a bottom plan view, and the right half thereof a top plan view; Figure 15 being a side elevation, half in section, with the section taken substantially in the vertical plane bisecting the wedge longitudinally as indicated by the line 15—15 of Figure 14; Figure 16 being an end view, half in section, with the section taken substantially in the vertical plane bisecting the wedge transversely as indicated by the line 16—16 of Figure 15; and Figure 17 being a further sectional view through the wedge surfaces substantially in the plane indicated by the line 17—17 of Figure 15.

Figures 18, 19, and 20 show a further embodiment of my invention, Figure 18 being the top plan view thereof, Figure 19 a side elevation, and Figure 20 a sectional view taken substantially in the transverse vertical plane bisecting the device as indicated by the line 20—20 of Figure 18.

Figures 21, 22 and 23 show the novel form of the top spring plate associated with the last-mentioned embodiment, Figure 21 being a top plan view thereof, Figure 22 a side elevation, and Figure 23 an end elevation, half in section, the section being taken in the transverse plane bisecting the plate substantially in the plane indicated by the line 23—23 of Figure 21.

Figures 24, 25, and 26 show my novel form of bottom spring plate associated with the last-mentioned embodiment of my invention, Figure 24 being a plan view thereof, Figure 25 a side elevation, and Figure 26 an end view, half in section, the section being taken substantially in the plane bisecting the plate as indicated by the line 26—26 of Figure 24.

Figures 27, 28, 29, and 30 show my novel form of follower wedge element utilized in the last-mentioned embodiment, Figure 27 being a plan view thereof, the upper half showing a top plan view and the lower half the bottom plan view; Figure 28 showing a sectional view substantially in the plane bisecting the wedge element in the longitudinal direction as indicated by the line 28—28 of Figure 27; and Figure 29 being an elevation view taken from the right as seen in Figure 27; and Figure 30 is a further sectional view through the wedge surfaces taken substantially in the plane indicated by the line 30—30 of Figure 28.

Referring in detail first to the embodiment shown in Figures 1 to 3 inclusive, my novel spring and friction device assembly comprises the top spring plate 2 with the downturned arcuate flange 4 at one end thereof, said arcuate flange taking the scallop-like form best seen in the top plan view of Figure 1, to conform to the curvature of the adjacent coil spring groups 6, 6, each of said groups being shown as comprising an outer coil 8 and an inner coil 10, similar coil spring groups 6, 6 likewise being supported at the opposite end of the assembly. At its opposite end the top spring plate may be cut off square as seen at 12, said end being so cut away to afford clearance for the tapering undersurface of the bolster end which may be superposed on the spring assembly as utilized in the ordinary freight car truck. At opposite sides of said top spring plate and centrally thereof may be formed the inwardly directed arcuate slots 14, 14 (Figure 8), defined in part by the inturned flanges or lugs 16, 16 at the opposite edges thereof, said lugs being formed with aligned openings 18, 18 for reception of rivets or bolts 20, 20 which may serve as securing means for the top follower wedge assembly generally designated 22, 22.

The bottom spring plate, generally designated 23, is shown in detail in Figures 11 to 13 inclusive and may be formed with scallop-like arcuate flanges 24, 24 at opposite ends thereof, said plate being symmetrical in form and said arcuate flanges 24, 24 conforming in curvature to that of the enclosed spring groups 6, 6 in manner as already described for one end of the top spring plate. The flanges 4, 24, 24 may extend over an arc sufficiently long to prevent lateral displacement of the enclosed spring groups 6, 6 when said spring groups are in assembly with the intervening friction absorbing device generally designated 26.

The bottom spring plate 23 may be slotted at opposite sides thereof as at 28, 28, said slots being aligned transversely of the plate in manner like that of the before-mentioned top spring plate and said slots being defined in part by the inturned lugs 16, 16 with aligned openings in which may be secured the rivets 20, 20 securing the follower wedge 22 at the bottom of the assembly. Each slot 28 is extended longitudinally of the plate beyond the lugs 16, 16 to form recesses 30, 30 at opposite ends of said slot (Figure 12), said recesses serving as convenient means of fixing said bottom spring plate with respect to the frame member (not shown) on which it may be seated as by means of spaced lugs 32, 32 which may be fixed on said frame member and positioned as indicated in the dotted lines at 32, 32.

My novel form of follower wedge assembly is shown in detail in Figures 4 to 7 inclusive and generally designated 34. It comprises a yoke 36 of rectangular shape, said yoke including two identical halves 38, 38 of identically formed angle irons or strips, the inturned end portions of which may be similarly formed with aligned openings 40, 40, said aligned openings having tapering side walls giving a general wedge shape thereto. In the construction of the follower wedge, the spaced side members 38, 38 may be placed in a jig and the identical end wedge members 42, 42 may be cast in place thereagainst, the metal of said wedge members 42, 42 being thus permitted to flow into the wedge openings 40, 40 and between the inturned ends of the side members 38, 38 as at 44, 44, thus fixing the cast iron portions 42, 42 with respect to the yoke 36. The before-mentioned securing bolts or rivets 20, 20 may extend through the cored openings 46, 46 formed in said wedge members 42, 42, thus further fixing said wedge members with respect to the top and said yoke as well as with respect to the top and bottom spring plates respectively. Each wedge member 42 may be formed with a V-shaped friction surface 48 interrupted centrally thereof by the slot 50 within which may be slidably received for tongue and groove engagement therewith a lug 52 (Figure 17), one of which may be formed at each edge of the side wedge generally designated 54. Each wedge member 42 may be formed with an integral lug 56 which may project beyond the plane of the yoke as well as beyond the plane of the associated spring plate, said lugs 56, 56 thus forming spaced top and bottom positioning means for the spring assembly in conjunction with co-operating recesses on supporting and supported frame members (not shown).

The detail of the side wedge is shown in Figures 14 to 17 inclusive wherein it may be noted that said wedge is of generally rectangular outline having on its inner face the spaced annular flanges 58, 58 defining the outer perimeter of the annular ledge 60 forming a spring seat for the outer coil 62 (Figure 3) of a compression spring, and having the central cavity or depression 64 serving as a seat for the inner compression spring 66. On the outer face of the side wedge may be formed oppositely tapered V-shaped friction surfaces 68, 68, said surfaces being complementary to the before-mentioned surfaces 48, 48 on the follower wedge members. Extending transversely across the V-shaped ends on the friction face side of the wedge is the flange or lug 52 which may be received in the before-mentioned slot 50 of the follower wedge as already described and illustrated in Figure 3. On the friction face side of the wedge and centrally thereof may be formed the transverse cavity 70 serving to reduce the thickness of the metal centrally of the side wedge and forming convenient forging structure.

The manner in which the side wedges 54, 54 co-operate with the wedge surfaces of the top and bottom followers is best shown in the sectional view of Figure 3. It will be noted that the top and bottom friction surfaces 68, 68 of each side wedge co-operate with friction surfaces on the top and bottom followers as at 72, 72. As shown in Figure 3, the friction device is fully expanded with the flanges or lugs 52, 52 at the top and bottom edges of the side wedge engaging shoulders defining the extremities of the slots 50, 50 in the top and bottom followers respectively. When the device is fully compressed, the extreme top and bottom edges of the side wedges may be afforded clearance from the top and bottom spring plates by the before-mentioned slots 14 and 28 therein respectively, and relative movement of the top and bottom followers toward each other may be limited by abutment of their opposed faces.

The embodiment illustrated in Figures 18, 19, and 20 is generally similar to that just described but differs therefrom in that the follower friction elements having engagement with the side wedges are mounted directly on the top and bottom spring plates instead of being formed in a separate assembly. In the modification now under consideration, the spring and friction absorbing assembly comprises the top spring plate 102, the bottom spring plate 104, a plurality of coil spring groups 106, 106 at each end of said assembly on opposite sides of an intervening friction absorbing device generally designated 108. Each spring group 106 comprises an inner coil 110 and an outer coil 112, and said spring groups may be confined at the ends of the assembly by the inturned arcuate flanges 114, 114 formed at both ends of the bottom plate but omitted from the inboard end of the top plate for the purpose already referred to. Each flange 114 may be of scallop-like form conforming in curvature to that of the adjacent spring groups as best seen in the top plan view of Figure 18.

The top spring plate 102 is shown in detail in Figures 21 to 23 inclusive. As in the previous modification the top spring plate is formed with aligned slots 116, 116 at opposite edges thereof, and in this modification said slots are defined by the inturned flanges 118, 118 which extend entirely around the edges thereof and in which may be formed the longitudinally aligned openings 120, 120 for reception of rivets 122, 122 which serve as means of securing the follower wedge elements 124, 124 to the plate in the before-mentioned slots 116, 116 at opposite sides thereof, each of said wedge elements 124 having the central rivet opening 123 extending therethrough and having its opposite faces in parallel abutment as at 127 (Figures 18 and 19) with the opposite legs of the enclosing flange 118.

The wedge element 124 is shown in detail in Figures 27 to 30 inclusive and may have an inwardly directed diagonal V-shaped friction surface 125 interrupted centrally thereof by the slot 126 terminated centrally of said element by a transverse shoulder which may engage as at 128 (Figure 20) and form stop means for the lug 130 formed at one end of the side wedge 132 in manner similar to the interlocking arrangement of the wedges and followers of the previous embodiment. Each wedge element 124 has an outwardly projecting lug 134 serving as means for positioning the spring assembly with respect to the associated truck frame members (not shown). At opposite sides of each wedge element 124 may be formed horizontal shoulders or ledges 136, 136 which may abut as at 138, 138 (Figure 19) the edges of the inturned flanges 118, 118 at opposite sides of the slot 116 in the associated spring plate, thus affording additional positioning means for said wedge elements with respect to said plates. On the outer face of each wedge element may be cored a slight depression as at 140, said depression being defined at opposite edges thereof by the slightly raised ledges 142, 142 which may be machined smooth in order to afford a clean fit with the inner face of the adjacent spring plate.

The bottom spring plate 104 of this modification is shown in detail in Figures 24 to 26 inclusive, said spring plate having at its opposite ends the before-mentioned inturned flanges 114, 114 of scalloped arcuate form, and like the top spring plate, said bottom spring plate is formed at opposite sides thereof with aligned slots 116, 116 defined by the inturned flanges 118, 118 extending therearound and serving in part as reinforcing means for said plate and also as support means for the wedge members 124, 124 which may be fixed therebetween as by rivets or bolts as clearly shown in the assembly views of Figures 18, 19, and 20. At opposite sides of each slot 116 in the bottom plate may be formed orifices 144, 144 for reception of lugs which may project upwardly on a supporting frame member (not shown) and serve as positioning means for said plate with respect to said frame member.

The side wedges 132, 132 of the present modification may be substantially identical with those described for the previous modification, having on their outer faces spaced V-shaped friction faces engaging as at 146, 146 the complementary friction faces of the follower wedge elements as best seen in the sectional view of Figure 20, said side wedges being urged into tight engagement with said follower wedge elements by means of the inner and outer coils 148 and 150 of the compression spring extending between said side wedges and afforded seats against the inner opposite faces thereof as in the previous modification. In this modification, as in the previous one, the top and bottom spring plate side slots 116, 116 are extended inwardly a sufficient distance to afford clearance as at 152, 152 (Figure 20) for the top and bottom edges of the adjacent side wedges as the device is fully compressed.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a spring group for a railway car truck, top and bottom spring plates, coil springs at each end thereof, and a friction absorbing device mounted between said plates intermediate said coils, said friction absorbing device having top and bottom followers with spaced diagonal friction surfaces, side wedges with complementary faces engaging said surfaces, resilient means under compression between said side wedges, each of said plates having at opposite edges thereof transversely aligned inwardly directed flanges, and securing means extending through said flanges and the adjacent follower.

2. In a spring group, spaced spring plates, a plurality of coil springs interposed therebetween, each of said spring plates having inturned flanges, certain of which afford positioning means for said springs and certain of which afford securing means for an associated friction absorbing device, a friction absorbing device mounted between said plates with opposite followers secured respectively thereto, side wedges and a resilient member under compression between said side wedges, each of said followers having a yoke portion, and wedges cast in opposite ends of said yoke portion.

3. In a spring group, top and bottom spring plates, coil springs between said plates at opposite ends of said group, transversely aligned slots in said plates at opposite edges thereof, a friction device follower fixed in the slots of each plate, side wedges engaging the follower wedges at opposite sides of said group, and resilient means under compression between said side wedges, each of said plate slots affording clearance from the associated follower for movement of the adjacent side wedge when said device is compressed.

4. In a composite spring group, top and bottom spring plates, coil springs at opposite ends of said group, inturned flanges on each plate defining transverse slots in opposite edges thereof, a friction absorbing device mounted between said plates with follower wedges secured in said slots, side wedges engaging the folower wedges at opposite sides of the group, and a coil spring under compression between said side wedges, each of said follower wedges having horizontal shoulders abutting the edges of the adjacent plate flanges.

5. In a spring group for a railway car truck, top and bottom spring plates, coil springs at each end thereof, and a friction absorbing device mounted between said plates intermediate said coils, said friction absorbing device having top and bottom followers with oppositely spaced diagonal friction surfaces, side wedges with complementary faces engaging said surfaces, and spaced concentric resilient means under compression between said side wedges, each of said followers having spaced positioning means for engagement with an associated frame member, each wedge affording seats in spaced planes for said spaced resilient means, each of said followers comprising a rolled steel yoke with iron wedges cast in opposite ends thereof.

6. In a spring group for a railway car truck, top and bottom spring plates, coil springs at each end thereof, and a friction absorbing device mounted between said plates intermediate said coils, said friction absorbing device having top and bottom followers with spaced diagonal friction surfaces, side wedges with complementary faces engaging said surfaces, resilient means under compression between said side wedges, each of said followers comprising a yoke, and wedges cast in the opposite ends of said yoke.

7. In a spring group for a railway car truck, top and bottom spring plates, coil springs at each end thereof, and a friction absorbing device mounted between said plates intermediate said coils, said friction absorbing device having top and bottom followers with spaced diagonal friction surfaces, side wedges with complementary faces engaging said surfaces, resilient means under compression between said side wedges, each of said followers comprising a steel yoke, and iron wedges cast in the opposite ends of said yoke.

8. In a spring group, spaced spring plates, a plurality of coil springs interposed therebetween, each of said spring plates having inturned flanges, certain of which afford positioning means for said springs and certain of which afford securing means for an associated friction absorbing device, a friction absorbing device mounted between said plates with opposite followers secured respectively thereto, side wedges, and a resilient member under compression between said side wedges.

9. In a composite spring group, top and bottom spring plates, coil springs therebetween at each end of said group, aligned slots in opposite edges of each plate intermediate said springs and defined in part by inturned flanges, follower wedges mounted in the slots of each plate, side wedges engaging the follower wedges at each side of the group, and resilient means under compression between said side wedges, each of said follower wedges having longitudinal shoulders abutting the adjacent plate flanges.

10. In a friction absorbing device, spaced followers each presenting opposed friction faces, a pair of friction shoes each in engagement with a face on each follower, and a plurality of telescoped resilient means compressed between said shoes and seated against each shoe in spaced planes, each of said followers comprising a rolled steel yoke with iron wedges cast in opposite ends thereof.

11. In a composite spring group, top and bottom spring plates, coil springs therebetween at each end of said group, aligned slots in opposite edges of each plate intermediate said springs and defined in part by inturned flanges, and a friction device having top and bottom followers recessed in said slots between said flanges, each of said followers comprising a yoke with wedges cast in opposite ends thereof.

12. In a composite spring group, top and bottom spring plates, coil springs therebetween at each end of said group, aligned slots in opposite edges of each plate intermediate said springs and defined in part by inturned flanges, follower wedges fixed in the slots at respective sides of each plate with shoulders engaging the edges of said flanges, and securing means extending through each follower wedge and the adjacent flanges.

13. In a composite spring group, top and bottom spring plates, coil springs therebetween at each end of said group, aligned slots in opposite edges of each plate intermediate said springs and defined in part by inturned flanges, follower wedges mounted in the slots of each plate, side wedges engaging the follower wedges at each side of the group, and resilient means under compression between said side wedges.

14. In a composite spring group, top and bottom spring plates, coil springs at opposite ends of said group, inturned flanges on each plate defining transverse slots in opposite edges thereof, a friction absorbing device mounted between said plates with follower wedges secured in said slots, side wedges engaging the follower wedges at opposite sides of the group, and a coil spring under compression between said side wedges.

15. In a spring group, top and bottom spring plates, coil springs between said plates at opposite ends of said group, transversely aligned slots in each plate at opposite edges thereof, a friction device follower fixed in the slots of each plate, side wedges engaging the follower wedges at opposite sides of said group, and resilient means under compression between said side wedges.

16. In a spring plate, arcuate flanges at opposite ends thereof affording positioning means for associated coil springs, and aligned slots at opposite edges thereof defined in part by spaced flanges affording securing means for an associated friction device follower.

17. In a composite spring group, top and bottom spring plates, coil springs therebetween at each end of said group, aligned slots in opposite edges of each plate intermediate said springs and defined in part by inturned flanges, and a friction device having top and bottom followers recessed in said slots between said flanges.

18. In a spring group, spaced spring plates, and a plurality of coil springs interposed therebetween, each of said spring plates having an inturned flange on at least one end thereof and affording positioning means for said springs, said plate also having a plurality of inturned flanges intermediate the ends thereof and affording securing means for an associated friction absorbing device.

19. In a composite spring assembly, a friction absorbing device follower comprising a rolled steel yoke, iron wedges cast in opposite ends thereof, and positioning means on each of said wedges for engagement with an associated frame member.

20. A friction absorbing device follower comprising a rolled steel yoke, and iron wedges cast in opposite ends thereof.

21. In a spring plate, a substantially flat member having an angularly disposed flange on at least one end thereof affording positioning means for associated resilient means, transversely aligned slots in opposite sides of said member, and lugs on said member partly defining said slots and affording securement for associated friction elements, said slots being extended longitudinally of said member and inwardly of said lugs to accommodate positioning means on an associated member.

ALFRED H. OELKERS.